US006472037B1

(12) United States Patent
Kane

(10) Patent No.: US 6,472,037 B1
(45) Date of Patent: Oct. 29, 2002

(54) NON-PERMANENT ADHESIVE-BACKED MAGNETIZED SECURING DEVICE

(75) Inventor: Jonathan E. Kane, Glenview, IL (US)

(73) Assignee: Kane Graphical Corporation, Chicago, IL (US)

(*) Notice: Subject to any disclaimer, the term of this patent is extended or adjusted under 35 U.S.C. 154(b) by 0 days.

(21) Appl. No.: 09/349,064

(22) Filed: Jul. 8, 1999

(51) Int. Cl.[7] .............................. B32B 9/00; B32B 7/12; H01F 1/00; H01F 1/04

(52) U.S. Cl. .................... 428/40.1; 428/40.9; 428/41.8; 428/343; 428/344; 428/354; 428/355 RA; 428/928; 148/300

(58) Field of Search ................................ 428/343, 344, 428/354, 355 RA, 40.1, 40.9, 41.8, 928; 148/300

(56) References Cited

U.S. PATENT DOCUMENTS

| | | | | | |
|---|---|---|---|---|---|
| 3,093,919 | A | * | 6/1963 | Holtz | 40/142 |
| 3,627,626 | A | | 12/1971 | Chao | |
| 4,176,478 | A | | 12/1979 | Brewer | |
| 4,200,222 | A | | 4/1980 | Feuer | |
| 4,530,177 | A | | 7/1985 | Kane | |
| 4,588,209 | A | | 5/1986 | Zebrowski et al. | |
| 4,644,645 | A | | 2/1987 | Audet | |
| 4,852,282 | A | | 8/1989 | Selman | |
| 4,912,864 | A | | 4/1990 | Price | |
| 5,303,489 | A | | 4/1994 | Blegen | |
| 5,342,665 | A | * | 8/1994 | Krawitz | 428/40 |
| 5,366,070 | A | | 11/1994 | Wolov | |
| D384,104 | S | * | 9/1997 | Krawitz | D19/52 |
| 5,670,226 | A | | 9/1997 | Yoshizawa et al. | |
| 5,699,956 | A | | 12/1997 | Brennan | |
| 5,799,423 | A | | 9/1998 | Malino | |
| 5,891,826 | A | | 4/1999 | Tsaur et al. | |
| 5,893,586 | A | | 4/1999 | McGuire | |
| 6,263,602 | B1 | * | 7/2001 | Seiber et al. | 40/606 |

OTHER PUBLICATIONS

FLEXcon Company, Inc., Product Data Sheets for FLEXmarks DEV–327 Adhesive and FLEXmarks V–378 Adhesive, no date.

* cited by examiner

*Primary Examiner*—Elizabeth M. Cole
*Assistant Examiner*—Jeremy R. Pierce
(74) *Attorney, Agent, or Firm*—Wallenstein & Wagner, Ltd.

(57) ABSTRACT

A non-permanent adhesive-backed magnetized securing device allows for affixing and removing objects from the adhesive portion of the device with minimal to no destruction or marring of the contacted surface of the object. The device includes a base member and a non-permanent adhesive connected to the base member. The base member has a surface that exhibits magnetic characteristics and is capable of magnetically connecting the device to a magnetic attracting element. The non-permanent adhesive is permanently affixed to another surface of the base member and is capable of allowing objects to be removably attached to the device. A dividing member may be located between the base member and the non-permanent adhesive. A permanent adhesive fixedly connects the dividing member to the base member.

9 Claims, 3 Drawing Sheets

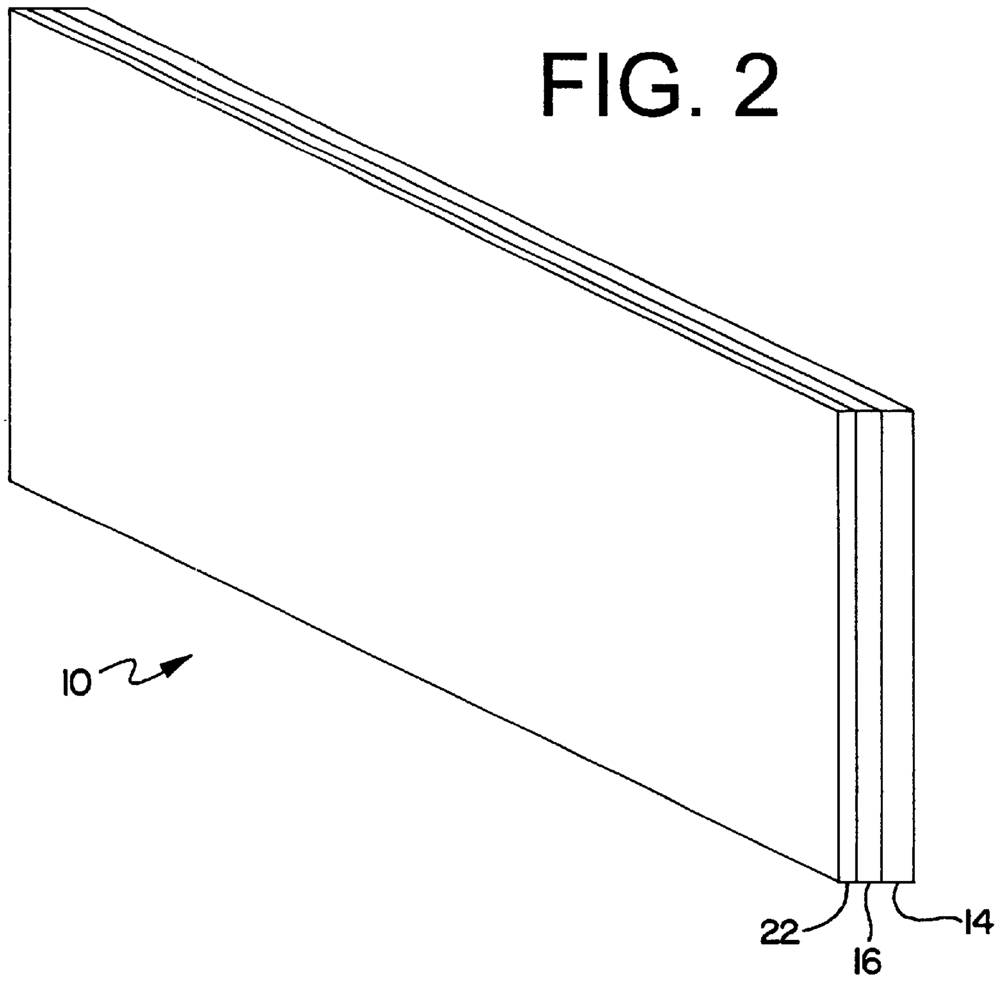
FIG. 2
FIG. 4
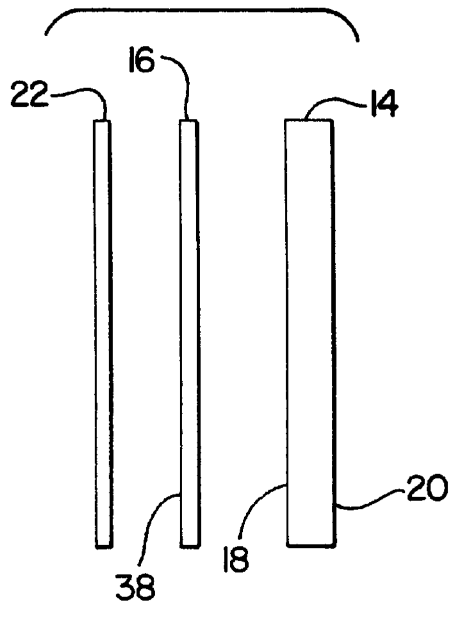

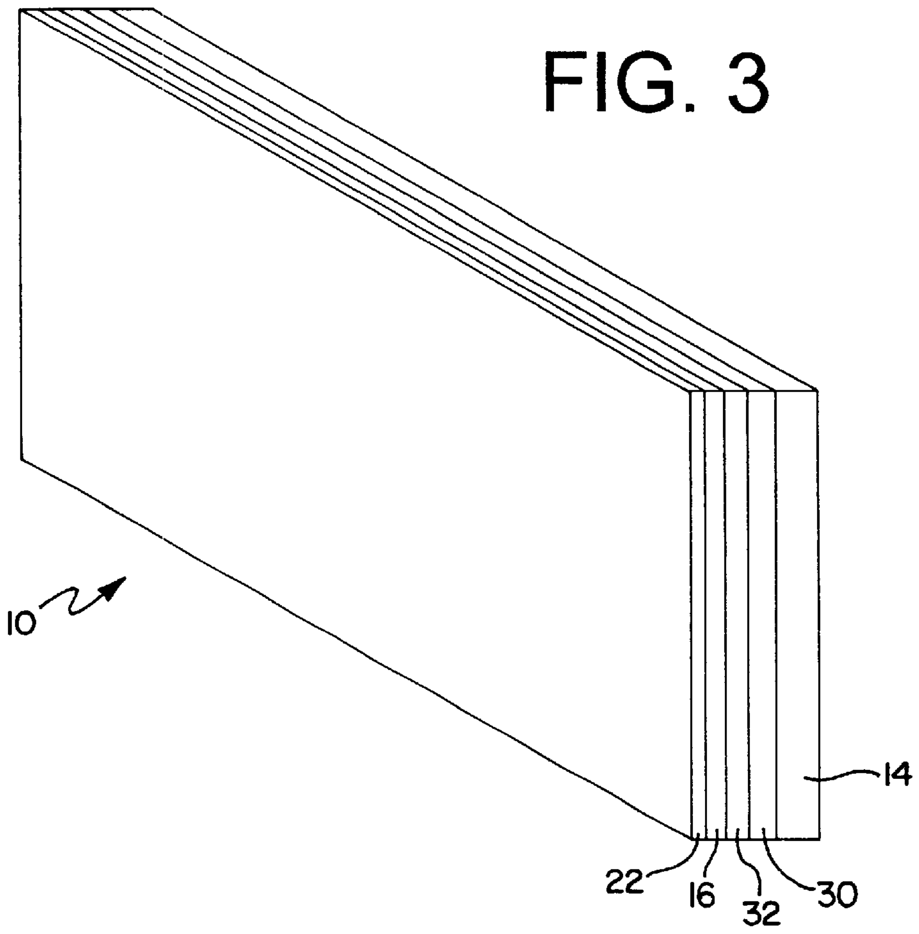
FIG. 3
FIG. 5
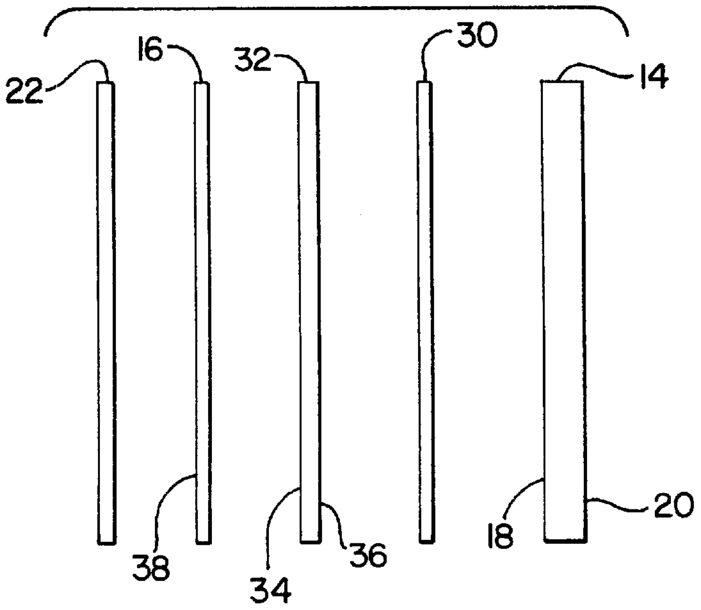

NON-PERMANENT ADHESIVE-BACKED MAGNETIZED SECURING DEVICE

DESCRIPTION

1. Technical Field

The present invention relates generally to devices which are capable of securing an object to a ferris surface, and more particularly, to magnetized securing devices having a non-permanent adhesive for removably securing an object thereto.

2. Background of the Invention

Magnetic devices are typically utilized to secure objects to ferris or other magnetically attracting elements. Several different types of magnetic devices exist, including: magnetic post cards, magnetic calenders, image containing magnets, magnetic ledger cards, magnetic holders, magnetic signs, etc . . . Numerous patents have been obtained for each of these different applications.

U.S. Pat. No. 5,699,956 issued to Brennan discloses a magnetic novelty card incorporating an outer plastic laminated to a thin paper-stock postcard containing a photograph or other image, a permanent adhesive layer connecting the postcard to one side of a sheet magnet, and another permanent adhesive layer connecting the other side of the sheet magnet to a paper backing for writing a note and addressing the post card. Accordingly, the postcard and paper backing are permanently connected to the magnet.

U.S. Pat. No. 5,893,586 issued to McGuire discloses a combination greeting card and calendar. The calendar has a magnetic fastener permanently attached to its back panel with a permanent adhesive for securing the calendar to a metal surface.

U.S. Pat. No. 5,799,423 issued to Malino discloses a perpetual magnetic calendar. Magnetic pieces magnetically adhere to a grid-like front surface of a calendar body. The magnetic pieces may include a feature such as indicia, an occasion, or a holiday affixed to a front surface thereof. The magnetic pieces are constructed of a strip magnet which is adhered by a pressure-sensitive permanent adhesive to a paper sheet. The paper sheet contains the indicia or other writing and may be laminated on its front and backside by a first and second transparent laminae. U.S. Pat. No. 4,176,478 issued to Brewer also discloses a perpetual calendar having blocks for the dates, months, year, etc. . . . Each block generally comprises a strip of magnetic tape permanently secured to the back of the indicia carrying block for magnetically affixing the block to the calendar front. Accordingly, like the previous disclosures, the indicia carrying material in each of these patents is permanently connected to the magnet.

U.S. Pat. No. 5,891,826 issued to Tsaur et al. discloses a method for affixing a thermal dye transfer image to a magnetic substrate. The process includes laminating a imaged intermediate dye-receiving element in face-to-face contact with a heat-activatable permanent adhesive layer to a magnetic substrate.

U.S. Pat. No. 3,627,626 issued to Chao discloses a magnetic ledger card and a method for forming the same. The final product includes a solvent based adhesive between a paper-base card and a magnetic tape. After a short setting period, the adhesive becomes permanent, thereby permanently affixing the paper-base card to the magnetic tape.

As explained above, each of these devices generally comprises a magnet with a permanent adhesive which allows an object to be fixedly attached to the magnet. The Assignee of the present application currently manufactures a product utilizing a similar means under the trademark "MagTabs"™. The MagTabs™ product comprises a flexible magnetic sheeting with a permanent adhesive attached to one surface of the magnetic sheeting. An object, such as a picture, photograph, piece of paper, etc . . . is then permanently secured to the magnet via the permanent adhesive. In all scenarios, whether the object is a piece of paper, an image, or some other element, the object remains permanently fixed to the magnet. If one were to attempt to remove the object from the magnet, at least the surface of the object connected to the adhesive, and typically a greater portion of the object than merely the surface thereof, would become damaged or destroyed. As the object is removed from the magnet, the portion of the object connected to the adhesive remains secured to the adhesive and tears away from the object itself. Since the magnet is therefore not reusable, a new or different magnet must be utilized for each different object or application.

Accordingly, a non-permanent adhesive-backed magnetized securing device in accordance with the present invention provides an inexpensive and easily manufactured removable magnetic securing device which eliminates the drawbacks of the prior magnetic securing devices described above.

SUMMARY OF THE INVENTION

The non-permanent adhesive-backed magnetized securing device of the present invention allows for affixing and removing of objects from the adhesive portion of the device with minimal to no destruction or marring of the contacted surface of the object. Further, the device has a quantified reusable lifespan, as opposed to being limited to a single use.

According to one aspect of the present invention, the device comprises a base member and a non-permanent adhesive connected to a first surface of the base member. The base member has a second surface that exhibits magnetic characteristics and is capable of magnetically connecting the device to a magnetic attracting element. The non-permanent adhesive is capable of allowing objects to be removably attached to the device. The non-permanent adhesive is permanently affixed to the first surface of the base member. A removable carrier is removably connected to the non-permanent adhesive to protect the non-permanent adhesive before use of the device. Upon removal of the carrier, the non-permanent adhesive is capable of adhering to an object.

According to another aspect of the present invention, the device further includes a permanent adhesive between and permanently affixing the non-permanent adhesive to the base member. Additionally, a dividing layer is located between the permanent adhesive and the non-permanent adhesive such that the permanent adhesive is located on one side of the dividing layer and the non-permanent adhesive is located on the other side of the dividing layer.

According to another aspect of the present invention, the inner or first surface of the base member is not magnetized. Depending upon the embodiment utilized, either the permanent or the non-permanent adhesive covers the entire first surface of the base member.

According to another aspect of the present invention, the magnetized removable securing device for removably securing an object to the device includes a first member having a first surface and a second surface, a dividing member having a first surface and a second surface, a first adhesive between the first member and the dividing member, and a second adhesive attached to the first surface of the dividing member. The first adhesive permanently connects the first surface of the first member and the second surface of the dividing member. The second adhesive is a non-permanent adhesive which has an outer surface that is capable of removably connecting objects thereto. As such, objects removed from the outer surface of the second adhesive are not damaged by the non-permanent adhesive.

According to another aspect of the present invention, a device for removably affixing an object to an outer surface of the device includes a magnetic material, a sheet-form material, a permanent adhesive connecting one side of the sheet-form material to the magnetic material, and a non-permanent adhesive that is capable of removably affixing objects thereto attached to the opposing side of the sheet-form material. The non-permanent adhesive remains affixed to the sheet-form material. And, the magnetic material has a non-magnetized surface which contacts the permanent adhesive.

According to yet another aspect of the present invention, the device includes a first subassembly laminated to a second subassembly. The first subassembly comprises a magnetized sheet. The second subassembly comprises a separating layer having a permanent adhesive on a first surface thereof, and a non-permanent non-destructive adhesive on a second surface thereof. The permanent adhesive of the second subassembly fixedly connects the second subassembly to the first subassembly.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 2 is an exploded perspective view of one embodiment of the non-permanent adhesive-backed magnetized securing device of the present invention;

FIG. 3 is an exploded perspective view of another embodiment of the non-permanent adhesive-backed magnetized securing device of the present invention;

FIG. 4 is a cross-sectional side view of the non-permanent adhesive-backed magnetized securing device of FIG. 2; and, FIG. 5 is a cross-sectional side view of the non-permanent adhesive-backed magnetized securing device of FIG. 3.

DETAILED DESCRIPTION OF THE PREFERRED EMBODIMENT

Figure 1:
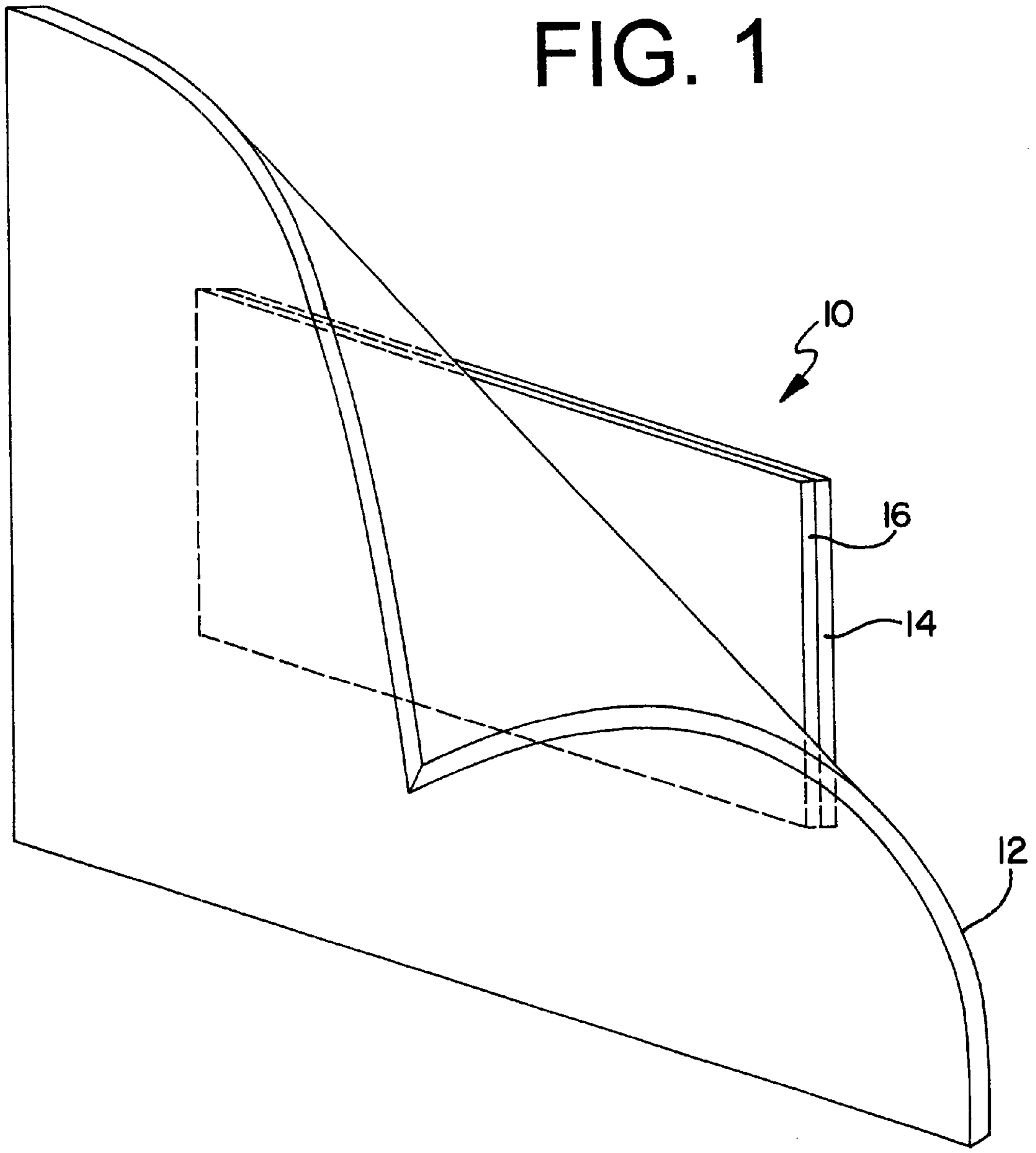
FIG. 1 is a perspective view of a non-permanent adhesive-backed magnetized securing device of the present invention with an object partially affixed thereto.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now in detail to the Figures, and initially to FIGS. 1, 2 and 4, there is shown a non-permanent adhesive-backed magnetized securing device 10 for removably securing an object 12. The securing device 10 generally comprises abase or first member 14 and a non-permanent adhesive 16. The base member 14 has a first surface 18 and a second surface 20 opposing the first surface 18. The second surface 20 of the base member 14 exhibits magnetic characteristics and is capable of magnetically connecting the device 10 to a metallic or magnetic attracting element such as a refrigerator or filing cabinet. Generally, the base member 14 comprises some variation of a magnetic material, or is magnetized in some manner. The non-permanent adhesive 16 is connected to the first surface 18 of the base member 14. In a preferred embodiment, the non-permanent adhesive 16 covers the entire first surface 18 of the base member 14. The non-permanent adhesive 16 is capable of allowing objects 12 to be removably attached to the device 10.

The non-permanent adhesive 16 is permanently affixed to the first surface 18 of the base member 14. If desired, a second permanent adhesive 30 may be located between the base member 14 and the non-permanent adhesive 16 to further secure and permanently affix the non-permanent adhesive 16 to the base member 14. A removable carrier 22 (see FIGS. 2 and 4) may be removably connected to the outer surface 38 of the non-permanent adhesive 16. The removable carrier 22 is adapted to protect the non-permanent adhesive 16 before use of the device 10. Generally, the removable carrier 22 remains connected to the non-permanent adhesive 16 at all times before removal of the carrier 22 in order to prepare the device 10 for affixing an object 12 to the device 10. When the carrier 22 is connected to the device 10, the non-permanent adhesive 16 is shielded from, and incapable of attaching to any objects. Upon removal of the carrier 22, however, access is provided to the non-permanent adhesive 16 such that the non-permanent adhesive 16 is capable of removably adhering to an object 12.

A non-permanent adhesive 16 is utilized to adhere to objects 12, as illustrated in FIG. 1, because the non-permanent adhesive 16, unlike permanent adhesives utilized in the prior art, is capable of allowing objects 12 to be repeatedly affixed and removed from the adhesive portion of the device 10 with minimal to no destruction or marring of the contacted surface of the object 12. The non-permanent adhesive 16 is of a type which allows for an object 12 to be non-permanently attached to the securing device 10, which causes substantially no damage to the object 12 upon removal of the securing device 10 from the object 12, and which also does not easily detach from the member 14,32 to which it is adhered. As shown in FIG. 1, pieces of paper, photographs, hanging objects, etc . . . can be affixed to the surface of the non-permanent adhesive 16, then removed, and the same or different objects can then be affixed to the same device 10. This is possible because, unlike prior art devices which incorporate a permanent outer-contact adhesive, the device 10 of the present invention incorporates a non-permanent or releasable outer-contact adhesive 16. Thus, when an object 12 is removed from the non-permanent adhesive surface 16 of the present invention, there exists substantially no indication on the contact surface of object 12 that it was previously adhered to the securing device 10. Further, the outer surface 38 of the non-permanent adhesive 16 likewise remains substantially damage free. Thus, not only is the object 12 not damaged, but the securing device 10 can be reused again with another object 12.

In the embodiment illustrated in FIGS. 3 and 5, an additional adhesive layer 30 and a dividing member 32 are introduced between the base member 14 and the non-permanent adhesive 16. In such embodiment, the dividing member 32 has a first surface 34 and a second surface 36, and is generally located between the additional adhesive layer 30 and the non-permanent adhesive 16. The dividing member 32 is generally comprised of any type of sheet-form material, including paper, but preferably comprises a plastic, such as a plastic film. Each surface 34,36 of the dividing member 32 is capable of having an adhesive layer connected thereto. Accordingly, this embodiment incorporates a base member 14, a dividing member 32, a first adhesive member 16 and a second adhesive member 30.

As explained above, the first adhesive member 16 comprises a non-permanent adhesive. The additional or second adhesive member 30, however, comprises a permanent adhesive. The second or permanent adhesive 30 is located between the first member 14 and the dividing member 32 such that the permanent adhesive 30 connects one side of the sheet-form material 32 (i.e., the dividing member) to the first magnetic member 14. As illustrated, the second adhesive 30 permanently connects the first surface 18 of the first member 14 with the second surface 36 of the dividing member 32. Further, with reference to the first embodiment, the first or non-permanent adhesive 16 is located at the opposing end of the device 10 as the base member 14, such that the connecting object 12 is removably secured to the non-permanent adhesive 16, while the magnetic portion 14 of the device 10 can be secured to another surface. The non-permanent adhesive 16 attaches and remains affixed to the opposing side 34 of the sheet-form material 32. Specifically, as illustrated, in the second embodiment the first adhesive 16 is attached to the first surface 34 of the dividing member 32. The first adhesive 16 has an outer surface 38 that is capable of removably connecting objects 12 thereto, such that the surface of objects 12 initially affixed and subsequently removed from the outer surface 38 of the first adhesive 16 are not substantially damaged by the non-permanent adhesive 16. Put another way, the surface of the removed objects 12 remain substantially damage-free.

In the preferred embodiment, the base or first member 14 of the device 10 comprises a permanently magnetized flexible thermoplastic sheeting material. Generally, one side or surface of the sheeting material is magnetized, and the other side or surface of the sheeting material is non-magnetized. With reference to FIGS. 2–5, the outer or second surface 20 of the base member 14 is magnetized such that the device 10 can be connected in a magnetic arrangement to a ferris or magnetically engaging surface. The inner or first surface 18 of the base member 14, however, is generally not magnetized, however, it too may be magnetized. The flexible magnetic sheeting utilized in the present invention is available is rolls of various thicknesses, lengths, and widths. In the embodiments illustrated, the base member 14 is generally 10–60 mils. thick. The flexible magnetic sheeting incorporated in the present invention is available from Magnum Magnetics Corporation.

With regard to the non-permanent adhesive 16, this element is preferably comprised of a removable pressure-sensitive acrylic adhesive. This adhesive is similar to the adhesive commonly utilized with POST-IT® notes. One such suitable adhesive is commercially available from FLEXcon Company, Inc., 1 FLEXcon Industrial Park, Spencer Mass. 01562-2642, under the product designation of FLEXmark® V-314 Adhesive. The specifications for this particular non-permanent adhesive are publically available from FLEXcon, and are incorporated by reference herein.

The permanent adhesive 30 is preferably comprised of an aggressive permanent pressure-sensitive acrylic adhesive. One such suitable adhesive is commercially from FLEXcom Company, Inc., under the product designation of FLEXmark® V-378 adhesive. This permanent-type adhesive has an average adhesion to acrylic component of 108 oz/in., and an expected range of adhesion to acrylic component of 105–135 oz/in. Additionally, this permanent-type adhesive has an average adhesion from polypropylene of 76 oz/in, and an expected range of adhesion to polypropylene of 60–90 oz/in. The average shear is 1 hour with a 4 lb. load on a one square inch test piece. The expected tack range is 400–700 gm/sq in..

One method of manufacturing the device is via lamination. Depending on the types of adhesive utilized, the lamination process can proceed under heat or under ambient temperature conditions. When utilizing the above identified adhesives, the lamination process preferably proceeds as a cold lamination process. Generally, a first subassembly is laminated to a second subassembly. With reference to FIG. 3, the first subassembly comprises a magnetized sheet which forms the base member 14. The second subassembly comprises a separating layer 32 having a permanent adhesive 30 on a second surface 36 thereof, and a non-permanent, non-destructive adhesive 16 on a first surface 34 thereof. Additionally, the second subassembly has a carrier 22 removably attached to the outer surface 38 of the non-permanent adhesive 16. The two subassemblies are cold laminated together using a standard laminating machine to create the overall securing device 10.

Typically, the first subassembly and the second subassembly are both provided on separate rolls of material. The second subassembly is rolled such that the outer surface of the permanent adhesive 30 contacts the releasable outer surface of the carrier 22. As such a separate releasing carrier is not required for the permanent adhesive 30.

During manufacture, the material of the first subassembly is unrolled and travels in-line with the unrolled material of the second subassembly, such that the first surface 18 of the first subassembly is adjacent the permanent adhesive 30 of the second subassembly. At the joining point in the lamination process, nip rollers converge to cold press the first subassembly, together with the second subassembly. The permanent adhesive 30 fixedly connects the second subassembly to the first subassembly, and forms a substantially permanent bond with the first surface 18 of the base member 14.

It should be understood that while the invention can take the shape of, and be cut (die cut or otherwise) into a square, a circle, some other polygon, the present invention can also be cut/stamped into novelty shapes. With certain manufacturing processes, the length and width of the various components are often substantially equal. Such novelty shapes can include animals, automobiles, and/or any other shape which a die cutting/stamping operation or other cutting/stamping operation can perform.

While the specific embodiments have been illustrated and described, numerous modifications come to mind without significantly departing from the spirit of the invention, and the scope of protection is only limited by the scope of the accompanying Claims.

I claim:

1. A device for securing an object to a magnetically attractive element, comprising:

a magnet; and, a non-permanent adhesive directly connected to a first surface of the magnet, the non-permanent adhesive being capable of allowing objects to be removably attached to the device.

2. The device of claim 1, wherein the non-permanent adhesive is permanently affixed to the first surface of the magnet.

3. The device of claim 1, further comprising a permanent adhesive between and permanently affixing the non-permanent adhesive to the magnet.

4. The device of claim 1, further comprising a removable carrier removably connected to the non-permanent adhesive, the carrier adapted to protect the non-permanent adhesive before use of the device, whereby removal of the carrier provides access to the non-permanent adhesive.

5. The device of claim 1, wherein the non-permanent adhesive covers the entire first surface of the magnet.

6. The device of claim 1, wherein the magnet comprises a thermoplastic sheeting material.

7. A device for removably affixing an object to an outer surface of the device, comprising:

a magnet;

a non-permanent adhesive; and, a permanent adhesive permanently directly connected to the magnet and connecting the non-permanent adhesive to the magnet, the non-permanent adhesive being capable of removably affixing objects thereto.

8. The device of claim 7, wherein the non-permanent adhesive is adapted such that during removal of the object from device, the surface of the object affixed to the non-permanent adhesive remains substantially damage-free.

9. The device of claim 7, wherein the magnet comprises a sheet material.

* * * * *